US012706106B2

(12) United States Patent
Zhou et al.

(10) Patent No.: US 12,706,106 B2
(45) Date of Patent: Aug. 11, 2026

(54) ADAPTIVE BLOCK SWITCHING WITH DEEP NEURAL NETWORKS

(71) Applicant: Dolby Laboratories Licensing Corporation, San Francisco, CA (US)

(72) Inventors: Cong Zhou, Foster City, CA (US); Grant A. Davidson, Burlingame, CA (US); Mark S. Vinton, Alameda, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 259 days.

(21) Appl. No.: 18/248,294

(22) PCT Filed: Oct. 15, 2021

(86) PCT No.: PCT/US2021/055248
§ 371 (c)(1),
(2) Date: Apr. 7, 2023

(87) PCT Pub. No.: WO2022/082021
PCT Pub. Date: Apr. 21, 2022

(65) Prior Publication Data

US 2023/0386486 A1 Nov. 30, 2023

Related U.S. Application Data

(60) Provisional application No. 63/092,685, filed on Oct. 16, 2020.

(30) Foreign Application Priority Data

Nov. 9, 2020 (EP) .................................... 20206462

(51) Int. Cl.
*G10L 19/022* (2013.01)
*G10L 19/032* (2013.01)
(Continued)

(52) U.S. Cl.
CPC .......... *G10L 19/022* (2013.01); *G10L 19/032* (2013.01); *G10L 19/04* (2013.01); *G10L 25/30* (2013.01)

(58) Field of Classification Search
CPC ..... G10L 19/022; G10L 19/032; G10L 19/04; G10L 25/30
See application file for complete search history.

(56) References Cited

U.S. PATENT DOCUMENTS 5,394,473 A 2/1995 Davidson
6,226,608 B1 5/2001 Fielder
(Continued)

FOREIGN PATENT DOCUMENTS

CN 1525761 A 9/2004
CN 1862969 B 6/2010
(Continued)

OTHER PUBLICATIONS

Klejin, W. Bastiaan, et al. "Wavenet based low rate speech coding." 2018 IEEE international conference on acoustics, speech and signal processing (ICASSP), IEEE, 2018. (Year: 2018).*
(Continued)

*Primary Examiner* — Bhavesh M Mehta
*Assistant Examiner* — Edward Tracy, Jr.

(57) ABSTRACT

The present invention relates to a method for predicting transform coefficients representing frequency content of an adaptive block length media signal, by receiving a frame and receiving block length information indicating a number of quantized transform coefficients for each block in the frame, the number of quantized transform coefficients being one of a first or second number, wherein the first number is greater than the second number, determining a first block has the second number of quantized transform coefficients, converting the first block into a converted block having the first
(Continued)

number of quantized transform coefficients, conditioning a main neural network trained to predict at least one output variable given at least one conditioning variable, the at least one conditioning variable being based on information regarding the converted block and block length information for the first block, providing at least one predicted transform coefficients from an output stage of the main neural network.

20 Claims, 6 Drawing Sheets

(51) Int. Cl.
*G10L 19/04* (2013.01)
*G10L 25/30* (2013.01)

(56) References Cited

U.S. PATENT DOCUMENTS

| | | | |
|---|---|---|---|
| 6,356,870 B1 | 3/2002 | Hui et al. | |
| 6,885,320 B2 | 4/2005 | Kim | |
| 7,466,245 B2 | 12/2008 | Unno | |
| 8,510,120 B2 | 8/2013 | Liebchen | |
| 9,135,929 B2 | 9/2015 | Mundt | |
| 9,306,524 B2 | 4/2016 | Smithers | |
| 9,570,085 B2 | 2/2017 | Disch | |
| 9,966,916 B2 | 5/2018 | Seefeldt | |
| 10,515,647 B2 | 12/2019 | Lars | |
| 10,629,213 B2 | 4/2020 | Rafii | |
| 10,701,303 B2 | 6/2020 | Wang | |
| 2004/0196913 A1 | 10/2004 | Chakravarthy et al. | |
| 2009/0112580 A1* | 4/2009 | Hirabayashi | G10L 13/07 704/205 |
| 2010/0023327 A1* | 1/2010 | Jung, II | G10L 21/0208 704/E19.001 |
| 2015/0279377 A1 | 10/2015 | Disch | |
| 2016/0064007 A1* | 3/2016 | Villemoes | G10L 19/032 704/203 |
| 2017/0025119 A1 | 1/2017 | Song | |
| 2019/0042867 A1 | 2/2019 | Chen | |
| 2019/0122678 A1 | 4/2019 | Rafii | |
| 2020/0111501 A1 | 4/2020 | Sung | |
| 2020/0184603 A1 | 6/2020 | Mukherjee | |
| 2020/0234720 A1 | 7/2020 | Sung | |
| 2020/0322377 A1 | 10/2020 | Lakhdhar | |
| 2022/0254350 A1* | 8/2022 | Guo | G10L 17/02 |

FOREIGN PATENT DOCUMENTS

| | | | |
|---|---|---|---|
| CN | 106778594 | A | 5/2017 |
| EP | 0428156 | A2 | 5/1991 |
| JP | H03145823 | A | 6/1991 |
| JP | 2000151413 | A | 5/2000 |
| JP | 2001154698 | A | 6/2001 |
| JP | 2008158302 | A | 7/2008 |
| JP | 2020087449 | A | 6/2020 |
| WO | 1991016769 | A1 | 10/1991 |
| WO | 0045389 | A1 | 8/2000 |
| WO | 2020047298 | A1 | 3/2020 |
| WO | 2020207593 | A1 | 10/2020 |
| WO | 2022081599 | A1 | 4/2022 |

OTHER PUBLICATIONS

Edler et al., “Coding of Audio Signals with Overlapping Block Transform and Adaptive Window Functions”, Translation from Frequenz, vol. 43, No. 9, pp. 252-256, 1989.

Fuchs, Guillaume et al.; “Low Delay LPC and MDCT-Based Audio Coding in the EVS Codec”; Jul. 7, 2005; IEEE International Conference on Acoustics, Speech and Signal Processing (ICASSP); pp. 5723-5727.

Jeon, Kwang Myung et al.; “An MDCT-Domain Audio Denoising Method With a Block Switching Scheme”; IEEE Transactions on Consumer Electronics; vol. 59; No. 4; Nov. 2013; pp. 818-824.

Johnston, J., “Audio Coding with Filter Banks,” in “Subband and Wavelet Transforms, Design and Applications,” Akansu and Smith (Eds.), Springer 1996.

Liu, Dong et al.; “Deep Learning-Based Video Coding: A Review and a Case Study”; ACM Computing Surveys; vol. 53; No. 1; Article 11; Jul. 12, 2005; pp. 11:1-11:35.

Painter, T. et al.“Perceptual Coding of Digital Audio” IEEE, vol. 88, Issue 4, Apr. 2000.

* cited by examiner

ADAPTIVE BLOCK SWITCHING WITH DEEP NEURAL NETWORKS

CROSS-REFERENCE TO RELATED APPLICATIONS

This application is a U.S. National Stage application under U.S.C. 371 of International Application No. PCT/US2021/055248, filed on Oct. 15, 2021, which claims the priority of U.S. Provisional Patent Application No. 63/092,685, filed on Oct. 16, 2020, and EP patent application No. 20206462.2, filed on Nov. 9, 2020, each of which are hereby incorporated by reference in their entireties.

FIELD OF THE INVENTION

The present invention relates to combining a generative model with existing high efficiency coding schemes for media signals. Specifically, the present invention relates to a method for predicting the transform coefficients of an adaptive block length media signal with a trained neural network.

BACKGROUND OF THE INVENTION

In low-rate adaptive block length encoding and decoding the encoder is configured to optimize the trade-off between frequency and time resolution. This may be achieved by selecting, by the encoder, a transform length for each signal sample block. In general, the encoder will select a long block, with a higher number of transform coefficients, for signal sample blocks representing signals with slowly evolving temporal characteristics and will select a set of short blocks, each with a lower number of transform coefficients, for signal sample blocks representing signals with rapidly evolving temporal characteristics.

A problem with encoding and decoding adaptive block length signals lies in that the blocks to be decoded may comprise a varying number of transform coefficients representing the frequency content of the media signal over varying time durations of the media signal. Adaptive block lengths are thus incompatible with traditional decoding schemes developed for fixed block length signals. Also, it would be beneficial to obtain in the decoder a more accurate representation of the original media signal which has been sampled in the encoder to form the signal sample blocks and adaptively divided into blocks of varying numbers of transform coefficients.

GENERAL DISCLOSURE OF THE INVENTION

Based on the above, it is therefore an object of the present invention to provide a method for predicting, with a neural network, transform coefficients of an adaptive block length media signal, and in particular an adaptive block length general audio signal.

According to a first aspect of the invention there is provided a method for predicting, with a computer implemented neural network system, transform coefficients representing frequency content of an adaptive block length media signal. The method comprising receiving a block of a frame, each block of the frame comprising at least one quantized transform coefficient (or a set of quantized transform coefficients) representing a partial time segment of the media signal, receiving block length information indicating a number of quantized transform coefficients for each block of the frame, the number of quantized transform coefficients being one of a first number or a second number, wherein the first number is greater than the second number, determining that at least a first block of the frame has the second number of quantized transform coefficients, converting at least the first block into a converted block having the first number of quantized transform coefficients, conditioning a main neural network trained to predict at least one output variable given at least one conditioning variable, the at least one conditioning variable being based on conditioning information, the conditioning information comprising a representation of the converted block and a representation of block length information for the first block, providing the at least one output variable to an output stage (output neural network) configured to provide at least one predicted transform coefficient from the at least one output variable.

As an alternative to quantized transform coefficients, the transform coefficients may be distorted or impaired. The transform coefficients outputted by the output stage (output neural network) are enhanced in the sense that they more closely resemble an original set of transform coefficients and/or that the enhanced transform coefficients inversely transformed into time domain describe a media signal which is perceived as a higher quality media signal compared to a time domain media signal described by the quantized transform coefficients. Further, a frame, as referred to herein, may include one or more blocks (e.g., a set of blocks).

The invention is at least partially based on the understanding that by converting the (short) first block into a (long) converted block with the first number of transform coefficients the generative properties of the trained main neural network may be introduced into variable block switching decoding. As neural networks have a fixed dimension in their output layers they are incompatible with adaptive length blocks. By converting the first block of the quantized transform coefficients into a converted block, and using a representation of the converted block and a representation of block length information to condition the main neural network, the neural network may predict the at least one (enhanced or non-quantized) transform coefficient in a dynamic manner based on block length. That is, as a representation of the block length information is comprised in the conditioning information (upon which the at least one conditioning variable is based), the main neural network will be trained to respond appropriately to a block having been converted to comprise the first number of transform coefficients.

Additionally, it may further be determined that a block of the frame comprises the first number of quantized transform coefficients. Such a (long) block may not be converted to a converted block and instead a representation of the block with the first number of quantized transform coefficients is comprised in the conditioning information. Besides not converting a long block, the long block may be treated analogously to a determined short block. The transform coefficients outputted by the output stage comprise the first number of transform coefficients representing either a quantized transform coefficient block with the first number of transform coefficients or converted block of the first number of quantized transform coefficients, which in turn represents at least one quantized transform coefficient block with the second number of transform coefficients.

As the main neural network may predict at least one transform coefficient for each of the variable length blocks in sequence, the main neural network takes temporal and/or frequency dependencies into consideration. The main neural network may have a memory function such that previous inputs affect the current processing and such that the prediction of a current (enhanced) at least one transform coefficient is influenced by earlier transform coefficients.

The adaptive length blocks represent a trade-off between frequency and time. A longer block comprises more transform coefficients and will represent a longer duration of the media signal, while a shorter block comprises fewer transform coefficients and will represent a shorter duration of the media signal.

According to a second aspect of the invention there is provided a method for obtaining at least one training block for training a computer implemented neural network system to predict at least one transform coefficient of an adaptive block length media signal. The method comprising obtaining a set of transform blocks each comprising a number of transform coefficients representing frequency content of a media signal, the number of transform coefficients in each block being a first number or a second number, wherein the first number is greater than the second number, determining that a first block comprises the second number of transform coefficients, converting the first block into a converted block having the first number of transform coefficients, obtaining a target predicted block from the converted block, quantizing the converted block, and obtaining a training block from the quantized converted block.

The obtained set of transform blocks may further represent a sequence of associated time domain window functions (short, long, bridge-in or bridge-out).

According to a third aspect of the invention there is provided a computer implemented neural network system for predicting at least one transform coefficient representing frequency content of an adaptive block length media signal. The neural network system comprising an adaptive block pre-processing unit configured to receive a frame comprising a set of quantized transform coefficients representing a partial time segment of a media signal, receive block length information indicating a number of quantized transform coefficients for each block in the frame, the number of quantized transform coefficients being one of a first number or a second number, wherein the first number is greater than the second number, determine that at least a first block has the second number of transform coefficients, and convert at least the first block into a converted block having the first number of quantized transform coefficients. The neural network system further comprising a main neural network, wherein the main neural network is trained to predict at least one output variable given at least one conditioning variable based on conditioning information, the conditioning information comprising a representation of the converted block and a representation of block length information for the first block, and an output stage, configured to provide at least one predicted transform coefficient from the at least one output variable.

In some implementations, the neural network system described in the above has been trained by using a set of target prediction blocks and a set of training blocks. The set of training blocks being an impaired representation of the target prediction blocks and the training blocks comprising at least one training block with the first number of transform coefficients and at least one training block with the second number of transform coefficients. The set of training blocks is provided to the adaptive block pre-processing unit of the neural network system and it is obtained from, from the output stage of the neural network system a set of predicted blocks from the set of training blocks. A measure of the predicted blocks with respect to the set of target prediction blocks is computed and the weights of the neural network system are modified to decrease the measure.

By modifying the weights of the neural network system in response to the measure of the predicted blocks, the training will result in the neural network system learning to predict (generate) at least one transform coefficient from at least one quantized transform coefficient. The training will result in the neural network system learning to properly recognize the at least one conditioning variable representing a short block(s) and process it in a manner such that the resulting at least one predicted transform coefficient closely resembles the at least one transform coefficient of the media signal.

It is understood that, based on acquiring the measure, the neural network system may be trained, preferably iteratively, by modifying parameters (e.g. the weights) of each neural network until a satisfactory small measure is achieved.

The invention according to the second and third aspects features the same or equivalent embodiments and benefits as the invention according to the first aspect. Further, any functions described in relation to a method, may have corresponding structural features in a system or code for performing such functions in a computer program product.

Experiments have been performed for encoding and decoding a reference media signal with a fixed block length and an adaptive block length. In the case of a fixed block length, a fixed length neural network system was implemented in the decoder, and in the case of adaptive block length the neural network system according to an implementation of the current invention was implemented in the decoder. The fixed block length encoding used 256 MDCT coefficient blocks and the adaptive block length encoding used adaptive 256/128 MDCT coefficient blocks. When comparing the decoded signals, adaptive block length switching with the neural network system of the present invention in the decoder showed reduced pre-echo distortion compared to the fixed block length counterpart.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

Figure 1:
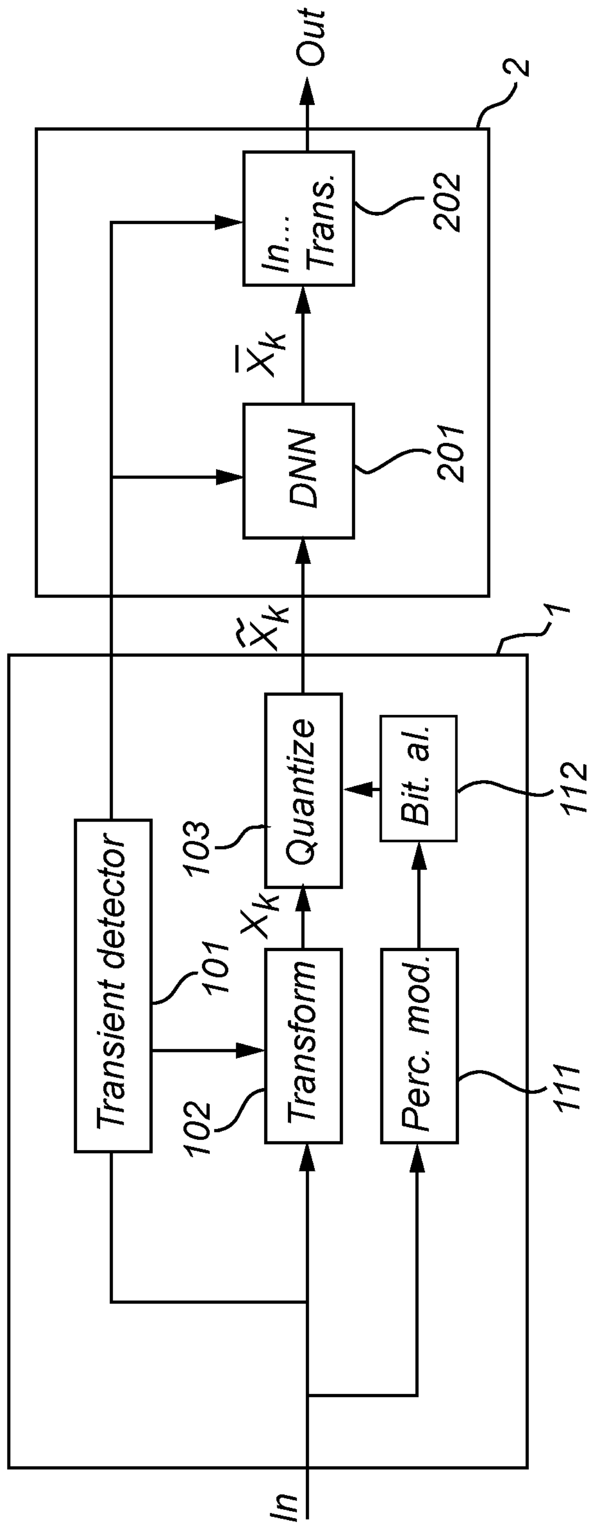
FIG. 1 shows an adaptive block length encoder and a decoder implementing the neural network system according to embodiments of the present invention.

FIG. 1 depicts an adaptive block length encoder/decoder system including an encoder 1 and a decoder 2. A media signal is received at the input port, at a transient detector 101. The media signal may be divided in a series of time domain frames and may further be divided into a plurality of time domain segments wherein each segment comprises a number of media signal samples. For example, a time domain frame comprises 16000 signal samples and is divided into four segments of 4000 samples. The number of signal samples in the time domain frame and the segments (thereby also the number of segments in the time domain frame) is merely exemplary, and may be any number. The transient detector 101 is configured to optimize, for each segment, the trade-off between frequency and time resolution by selecting a transform length. In general, the transient detector 101 selects a long transform length for segments containing signals with slowly-evolving or stationary temporal characteristics and selects shorter transform lengths for segments containing signals with rapidly-evolving temporal characteristics. By optimizing 'perceptual coding gain' for both short and long signal classes, this approach offers a fundamental advantage over coding with time-invariant transform lengths.

Depending on the temporal characteristics of a segment of the media signal the transient detector 101 may select to request that the segment should be represented by a transform domain block with a first number of transform coefficients (for slowly-evolving temporal signal segments) or a plurality of transform domain blocks each comprising a second number of transform coefficients (for rapidly-evolving temporal signal segments), where the first number is greater than the second number. For example, the transient detector 101 may request that a slowly-evolving segment is represented with 256 transform coefficients $X_k$ while a rapidly-evolving segment is represented with two sets (transform domain blocks) of 128 transform coefficients $X_k$, or four sets of 64 transform coefficients $X_k$. The number of chosen transform coefficients are not limited to the included examples, and any number may be chosen. The transient detector 101 may request a number of transform coefficients among a set of block lengths, wherein the set of block lengths comprises at least two lengths such as 256/128. In some implementations, the set of block lengths comprises at least three or more lengths such as 256/128/64 among which the transient detector 101 may select a suitable length for a block. For example, the transient detector 101 may request that a segment is represented by a combination of short blocks of varying lengths. For example, a slowly evolving segment is represented by 256 transform coefficients $X_k$, while a following rapidly evolving segment is represented by one block with 128 transform coefficients $X_k$ and two blocks with 64 transform coefficients $X_k$. The transient detector 101 generates block length information which represents the requested number of transform domain blocks (and/or number transform coefficients $X_k$ for each block) with which the time domain segments should be represented. The block length information is transmitted to the decoder 2. The transient detector 101 passes the block length information to the transform unit 102.

The transform unit 102 transforms the segments according to the block length information and outputs the adaptive length transform blocks comprising transform coefficients $X_k$ to a quantizer 103. For the example mentioned in the above, a 16000 sample time frame having been divided into four 4000 sample segments is transformed into a series of transform blocks with 256, 256, 128, 128 and 256 transform coefficients $X_k$ respectively. These transform blocks may then form a transform domain frame (frame) in the encoder 1 and/or decoder 2. In other words, a frame may be referred to as a set of one or more transform blocks and/or one or more segments. In parts of the encoder 1 and in the decoder 2, the frame to which a transform block belongs may not be explicitly indicated or considered as it suffices to treat the transform blocks in series without regard to their respective time or transform domain frame.

The received media signal is further received by a perceptual model 111 which computes a masking threshold. The masking threshold is passed to a bit allocation unit 112.

In the bit allocation unit 112, a bit allocation for the soon to be quantized transform coefficients is assigned based on the received perceptual masking threshold information received from the perceptual model 111. The bit allocation unit 112 may allocate bits to reduce or minimize the quantization noise. The bit allocation unit 112 passes the bit allocation information to the quantizer 103.

The quantizer 103 quantizes the transform coefficients $X_k$ of each block among the adaptive block length blocks by allocating bits to each transform coefficient according to the received bit allocation information, to form quantized transform coefficient $\tilde{X}_k$ blocks. The quantizer 103 transmits the adaptive block length blocks comprising quantized transform coefficients ($\tilde{X}_k$) to the decoder 2.

In the decoder 2, a neural network (NN) system 201 receives a frame, where each block of the frame comprises at least one quantized transform coefficient $\tilde{X}_k$, from the quantizer 103 of the encoder 1, and block length information, from the transient detector 101 of the encoder. The neural network system 201 comprises a main neural network and an output stage (e.g., an output neural network) trained to predict at least one transform coefficient (the at least one predicted transform coefficient $\bar{X}_k$) from quantized transform coefficients $\tilde{X}_k$. A conversion stage of the neural network system 201 converts blocks with the second number of quantized transform coefficients $\tilde{X}_k$ to converted blocks comprising the first number of quantized transform coefficients $\tilde{X}_k$. In some implementations the conversion stage neural network system 201 merely passes on blocks with the first number of quantized transform coefficients $\tilde{X}_k$. Accordingly, the output stage of the neural network system 201 may output a sequence of static length blocks (e.g. each comprising the first number of predicted transform coefficients $\bar{X}_k$) wherein some blocks represent a quantized block of the same length and wherein some blocks represent at least one, and in some implementations more than one, short blocks of a different (shorter) length.

The at least one predicted transform coefficient $\bar{X}_k$ is received at an inversion transform unit 202 configured to transform the at least one predicted transform coefficient $\bar{X}_k$ of each transform domain block into time domain segments (i.e. predicted time domain segments). The inverse transform unit 202 may in some implementations receive block length information from the transient detector 101 of the encoder 1.

As described in the above, the at least one predicted transform coefficient $\bar{X}_k$ that arrives as blocks to the inverse transform unit 202 may be of a static predetermined length despite some blocks representing one or more quantized blocks of an originally (pre-conversion) shorter length. As the inverse transform unit 202 receives information of this original transform domain block length in the form of block length information, the inverse transform unit 202 may take necessary pre-inverse transform processing steps. For instance, in response to a predicted long block being associated with an originally short block which was up-sampled to form a converted block in the conversion unit, the inverse transform unit 202 may down-sample the predicted long block to a predicted short block prior to inverse transforming the short block to the time domain. In another example, at least two short blocks with quantized transform coefficients $\tilde{X}_k$ are converted into a single converted block in the conversion unit and are predicted by the neural network system as a single long block of at least one predicted transform coefficient $\overline{X}_k$. In such a case, the inverse transform unit 202 may determine from the block length information that the predicted long block is in fact a prediction based on at least two short blocks (which have been combined) and in response perform pre-inverse transform processing steps, such as splitting or performing an inverse conversion procedure, i.e. the inverse of the conversion carried out in the neural network system 201, to obtain predicted blocks of the same length as determined by the transient detector 101 in the encoder 1. The pre-inverse transform processing steps may be carried out by a separate (not shown) unit preceding an inverse transforming unit for some pre-existing coding scheme for adaptive block length media signals. For instance, the neural network system (together with pre-inverse transform processing) may be implemented together with any existing codecs, e.g. to refine AC-4 transform coefficients, or using it with a new codec designed for decoding with a neural network system 201.

In yet a further implementation, the inverse transform unit 202 transforms each predicted block (being of a static length) into the time domain such as if the set of predicted blocks is from a static length media signal. In such implementations, the inverse transform unit does not need to consider the block length information and the neural network system effectively converts an adaptive block switching media signal to a static block length media signal. The neural network system 201 receives blocks of varying lengths and is trained to output fixed length blocks. The inverse transform unit 202 transforms the static length blocks to a time domain media signal.

The inverse transform unit 202 outputs a time domain media signal (or a sequence of time domain media signal blocks) suitable for playback by a playback device (not shown). The neural network system 201 is configured to receive at least one quantized transform coefficient in a block and predict at least one transform coefficient.

Figure 2:
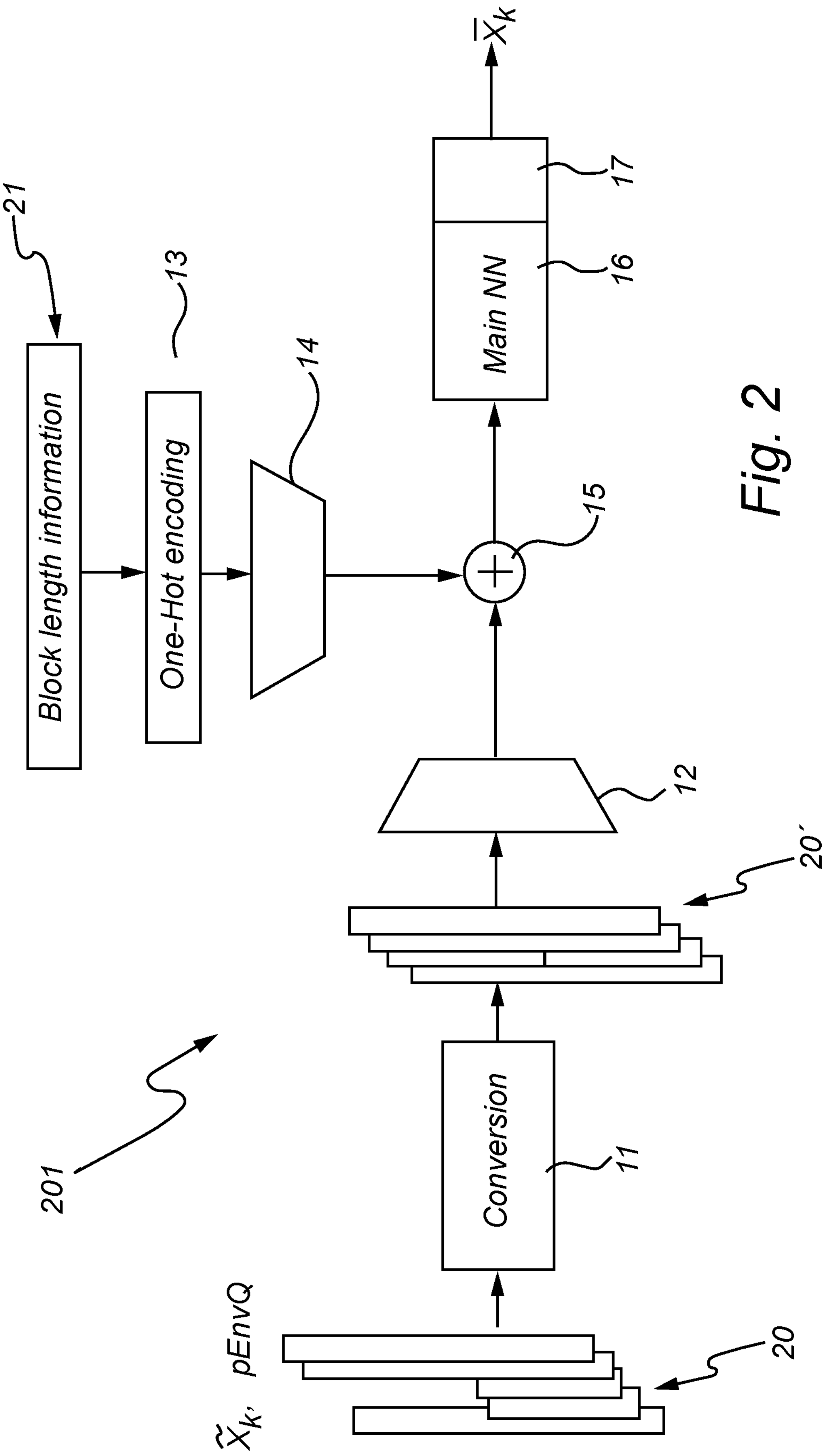
FIG. 2 shows a neural network system according to embodiments of the present invention.

With reference to FIG. 2, an embodiment of the computer implemented neural network system 201 in FIG. 1 is depicted in more detail. The neural network system 201 is configured to receive a set of adaptive length blocks 20 each comprising a set of quantized transform coefficients $\tilde{X}_k$ representing the frequency content of a partial time segment of a media signal and block length information 21 indicating a number of quantized transform coefficients for each block in frame 20, the number of quantized transform coefficients being one of a first number or a second number. The computer implemented neural network system 201 further comprises a conversion stage 11 that is configured to determine that at least a first block has the second number of quantized transform coefficients, and convert at least the first block into a converted block having the first number of quantized transform coefficients. From frame 20 to the conversion stage 11, where frame 20 has at least one block with the second number of quantized transform coefficients, the conversion stage generates an output frame 20' wherein the output blocks in the output frame all have the first number of quantized transform coefficients.

The neural network system 201 further receives block length information 21 indicating a number of quantized transform coefficients for each block in frame 20. The block length information 21 thereby indicates the sequence of blocks comprising the first or second number of transform coefficients. The block length information 21 may be a sequence of integers or symbols, each integer or symbol representing a block and the value of each integer (or the type of symbol) representing the number of quantized transform coefficients $\tilde{X}_k$ of that block.

The block length information 21 may comprise more than two alternative block lengths. In some implementations a block with the first number of transform coefficients $X_k$ that precedes a block with the second number of transform coefficients $X_k$ may be labelled as a bridge-in block and a block with the first number of transform coefficients $X_k$ that succeeds a block with the second number of transform coefficients $X_k$ may be labelled as a bridge-out block. Accordingly, the block length information 21 may be a sequence of four (or more) different integers, one for each of a long block (first number of transform coefficients $X_k$), a short block (with the second number of transform coefficients $X_k$), a bridge-in block and a bridge-out block.

The neural network system 201 forms at least one conditioning variable 15 based on conditioning information, wherein the conditioning information comprises at least two components, (i) information representing the converted block (or representing a block comprising the first number of quantized transform coefficients) and (ii) information representing the block length information 21. In a simple case, information representing the converted block is the quantized transform coefficients $\tilde{X}_k$ per se, and the block length information representation is an integer. The at least one conditioning variable 15 and the main neural network 16 may feature a separate dimension for each piece of conditioning information or a single dimension onto which each piece of conditioning information is projected.

The at least one conditioning variable 15 is used to condition a main neural network 16. The main neural network 16 is trained to predict at least one output variable given at least one conditioning variable 15, and the at least one output variable is provided to an output neural network 17 trained to make a final prediction of at least one transform coefficient (i.e. outputting at least one predicted transform coefficient $\overline{X}_k$) given at least one output variable from the main neural network 16. The output neural network 17 may comprise one or more hidden layers.

The main neural network 16 may be any type of neural network, e.g. a deep neural network, a recurrent neural network or any neural network system. The main neural network 16 may be a regressive model. The media signal may be any of type of media signal including an audio or video signal. In case of the media signal being an audio signal, the main neural network 16 is in a preferred embodiment serving as a general audio generative model in the transform domain. The main neural network 16 is configured to operate in the transform domain and is trained to predict at least one output variable given at least one conditioning variable. The at least one output variable may be considered a hidden state and is provided to the output neural network 17, wherein the output neural network 17 is configured (e.g. trained) to output at least one predicted transform coefficient given the at least one output variable. The output neural network 17 may be implemented together with the main neural network 16 as a single unit, e.g. as an output stage of the main neural network 16 or as a separate neural network. Regardless, the output neural network 17 and the main neural network 16 exchange hidden state information.

The at least one transform coefficient $\overline{X}_k$ is thus predicted from the at least one quantized transform coefficients $\tilde{X}_k$ by the main neural network 16 and the output neural network 17 by capturing temporal and/or frequency dependencies of the representation of the quantized transform coefficients. That is, the main neural network 16 and the output neural network 17 may be trained such that previous representations of transform coefficients having been processed by the main neural network 16 may influence the prediction of the current at least one transform coefficient. Additionally or alternatively, the main neural network 16 and output neural network 17 are trained such that interdependencies between transform coefficients in a current block and past blocks are considered. As the transform coefficients represent frequency content, the main neural network 16 and the output neural network 17 may be trained to predict at least one transform coefficients by learning how the frequency content (which is represented in the transform coefficients) of a first frequency band affects the frequency content of a second frequency band.

In some implementations the neural network system 201 further comprises an additional neural network, such as a conditioning neural network 12 connected to receive output from the conversion unit 11 and receive block length information from block length information neural network 14. The conditioning neural network 12 and the block length information neural network 14 are used to predict a respective piece of conditioning information and may be any type of neural network, e.g. a convolutional layer, and using one type does not necessitate the other type.

The conditioning neural network 12 and/or the block length information neural network 14 may be trained to predict a respective at least one output variable, where the at least one conditioning variable 15 is then obtained as the sum of the respective at least one predicted output variable. Further, the at least one conditioning variable 15 being passed to the main neural network 16 (being e.g. a sum of the respective at least one output variable from the conditioning neural network 12 and block length neural network 14) may be regarded as a hidden neural network layer. Besides establishing an inner dimension (as a hyperparameter) for the hidden layer which matches the input dimension of the main neural network 16, the neural network system 201 may be operated (and trained) without any constraint on the interpretability of the hidden layer. For example, the conditioning information representing the quantized transform coefficients and the representation of the block length information may each be at least one output variable in the shape of matrices of a dimension matching the inner dimension. The at least one condition variable 15 may then be the sum of the at least one matrix output variable. In a further example, the matrices are two-dimensional and comprise a single row or column (i.e. a vector).

The conditioning neural network 12 is trained to predict a representation of a block from output frame 20' given the quantized transform coefficients$\tilde{X}_k$ of the block. By predicting the representation of the quantized transform coefficients of the converted block, with a conditioning neural network 12 trained to predict the representation, a representation which further facilitates prediction by the main neural network 16 may be achieved. As opposed to assigning a static translation function for the quantized transform coefficients $\tilde{X}_k$ that translates them into information representing the quantized transform coefficients $\tilde{X}_k$, the conditioning neural network 15 may be trained to predict a representation which facilitates making the final prediction by the main neural network 16 and the output neural network 17.

In a similar manner, the block length information neural network 14 is trained to predict a representation of the block length information given block length information 21. By implementing a block length neural network 14 trained to predict a representation of the block length information given block length information 21 of at least the first block, the conditioning information used to condition the main neural network 16 will carry information indicating the number of quantized transform coefficients $\tilde{X}_k$ in the first block in a format that facilitates prediction of at least one transform coefficient $\overline{X}_k$ by the main neural network 16 and the output neural network 17. In one example, the block length neural network 14 outputs a representation of the block length information which indicates a block with the first number of transform coefficients $X_k$. Accordingly, the main neural network 16 is conditioned differently, and will respond differently, when the represented quantized transform coefficients $\tilde{X}_k$ are from a converted block or from a quantized block with the first number of transform coefficients $\tilde{X}_k$. As the main neural network 16 and output neural network 17 have been trained to predict at least one transform coefficient from information representing the quantized transform coefficients $\tilde{X}_k$ together with conversion unit 11, the prediction of the at least one transform coefficient may be accomplished regardless of the manner in which the converted block was constructed from at least the first block.

As opposed to conditioning the block length neural network with e.g. an integer from the sequence of integers, some implementations of the neural network system 201 comprise a One-Hot encoder 13, which converts the block length information 21 to One-Hot vectors which in turn are used to condition the block length neural network 14. The block length information is categorical and indicates for each block a separate state (e.g. long, short, bridge-in or bridge-out). With One-Hot encoding, these categorises are separated into individual vector elements which facilitates the training and prediction of the block length neural network 14 by clearly distinguishing between the different possible states. For example, One-Hot encoding promotes a strong spatial dependence between the predicted at least one output variable and which input element of the input layer of the block length neural network that receives the one hot (on-state) vector element.

In some implementations the neural network system 201 further receives for each block perceptual model coefficients pEnvQ and/or a spectral envelope. The conditioning information may thus further include additional pieces of information that are a representation of perceptual model coefficient pEnvQ information and/or spectral envelope information. The perceptual model coefficients pEnvQ and/or spectral envelope may be processed in parallel with the block length information and the quantized transform coefficients and either combined with other information in the at least one conditioning variable 15 or provided as side information in a separate dimension, to the main neural network 16.

The set of perceptual model coefficients pEnvQ may be derived from a perceptual model, such as those occurring in the encoder. The perceptual model coefficients pEnvQ are computed per frequency band and are preferably mapped onto the same resolution as the frequency coefficients of a block to facilitate processing.

In implementations where a single short block has been converted to a converted block, the pEnvQ coefficients are converted to an equivalent long block representation by an analogous conversion procedure and used as conditioning information. For example, if a short block is up-sampled, the pEnvQ coefficients are up-sampled in the same way.

It is noted that with a neural network system 201 that is 'trained' in implementations featuring more than one neural network, all the neural networks in the system are, during at least a portion of the training, trained together. For example, the block length neural network 14 may be trained together with the main neural network 16 wherein the inner parameters (e.g. weights) of each neural network 14, 16 are modified to optimize some measure of the predicted at least one transform coefficient $\bar{X}_k$ compared to some target predicted at least one transform coefficient, such as the original non-quantized transform coefficients $X_k$. The block length neural network 14 is then trained to output at least one conditioning variable 15 which brings the predicted at least one transform coefficient of the main neural network 16 and the output neural network 17 to resemble the original transform coefficients as closely as possible. The main neural network 16 and output neural network 17 are simultaneously trained to predict at least one transform coefficient $\bar{X}_k$ that resemble the original transform coefficients $X_k$ as closely as possible.

The conversion in the conversion unit 11 of blocks with the second number of transform coefficients may involve the up-sampling of a block with the first number of quantized transform coefficients $\tilde{X}_k$ to a converted block. Up-sampling may include linear or polynomial interpolation (and optionally extrapolation) of the second number of quantized transform coefficients to the first number of quantized transform coefficients. Alternatively, up-sampling to form a converted block may comprise one of: repeating each quantized transform coefficient a predetermined number of times, adding zero elements in between non-zero elements or interleaving the quantized transform coefficients $\tilde{X}_k$. Alternatively, any other suitable up-sampling, expansion or interpolation technique is applicable. In some implementations the conversion unit 11 merely forwards the quantized transform coefficients $\tilde{X}_k$ of a block to the main neural network 16, which is trained to predict at least one output parameter for the output neural network 17. In this case the main neural network 16 will learn to recognize a block with the second number of quantized transform coefficients $\tilde{X}_k$ and absorb by training the functions of the converter.

As an alternative to converting in the conversion unit 11 a first block comprising the second number of quantized transform coefficients $\tilde{X}_k$ into at least two blocks, a first block and a second block, each comprising the second number of quantized transform coefficients $\tilde{X}_k$, the first block and the second block may jointly be converted into a converted block comprising the first number of quantized transform coefficients $\tilde{X}_k$. Accordingly, the main neural network 16 and output neural network 17 may be trained to predict at least one transform coefficient $\bar{X}_k$ given a representation of a converted block comprising a first number of quantized transform coefficients $\tilde{X}_k$, where the quantized transform coefficients $\tilde{X}_k$ of the converted block originate from the quantized transform coefficients $\tilde{X}_k$ of at least the first and second block.

In general, the at least first and second blocks having the second number of quantized transform coefficients $\tilde{X}_k$ may be N consecutive blocks having the second number of quantized transform coefficients $\tilde{X}_k$, where the first number is a multiple N of the second number. The N consecutive blocks may then be converted to a converted block with the first number of quantized transform coefficients $\tilde{X}_k$. The adaptive block switching media signal may, for example, include a first number of quantized transform coefficients $\tilde{X}_k$ equal to 256 and a second number equal to 128, i.e. for N=2. A first number equal to 256 and N=4 would result in four short blocks, each comprising 64 quantized transform coefficients $\tilde{X}_k$, being converted into one converted block. In yet a further example, N=8, when the first number of transform coefficients is 1024, then the second number of quantized transform coefficients $\tilde{X}_k$ is 128.

Converting at least the first and second block into a converted block may comprise concatenating at least the first and the second block into a converted block. Concatenation is an efficient and easily implemented method of converting at least the first and second block into a converted block.

In some implementations the conversion unit 11 receives for each block a representation of a respective time domain window function, where the window function of the first and second block partially overlap.

The window functions may be received together with the quantized transform coefficients $\tilde{X}_k$ or with the block length information 21 (being passed onto the conversion unit 11). Alternatively, the window functions may be constructed from the block length information 21 (being passed to the conversion unit 11). Or, the window functions may be constructed by determining the number of quantized transform coefficients $\tilde{X}_k$ for a block in the conversion unit 11 by utilizing the correlation between number of quantized transform coefficients in a block and the sequence of the blocks with at least the first and second numbers of quantized transform coefficients in each block. For example, a block with the first number of quantized transform coefficients $\tilde{X}_k$ is associated with a long window function and a block with the second number of transform quantized coefficients $\tilde{X}_k$ is associated with a short window function. In a further example, a block with the first number of quantized transform coefficients $\tilde{X}_k$ may be associated with a bridge-in window function if this block precedes a block with the second number of quantized transform coefficients $\tilde{X}_k$.

In FIG. 2, all of the functions and units described as operating up-stream of the (optional) conditioning neural network 12 and the (optional) block length information neural network 14 may be referred to as a pre-processing unit or an adaptive block pre-processing unit. The pre-processing unit may thus be a multiple input multiple/single output unit, e.g. receiving block length information 12 and quantized transform coefficients $\tilde{X}_k$ and output information representing the quantized transform coefficients $\tilde{X}_k$ and representing the block length information 12 as separate pieces of information (at least one variable) or a combined piece of information (at least one variable).

Figure 6:
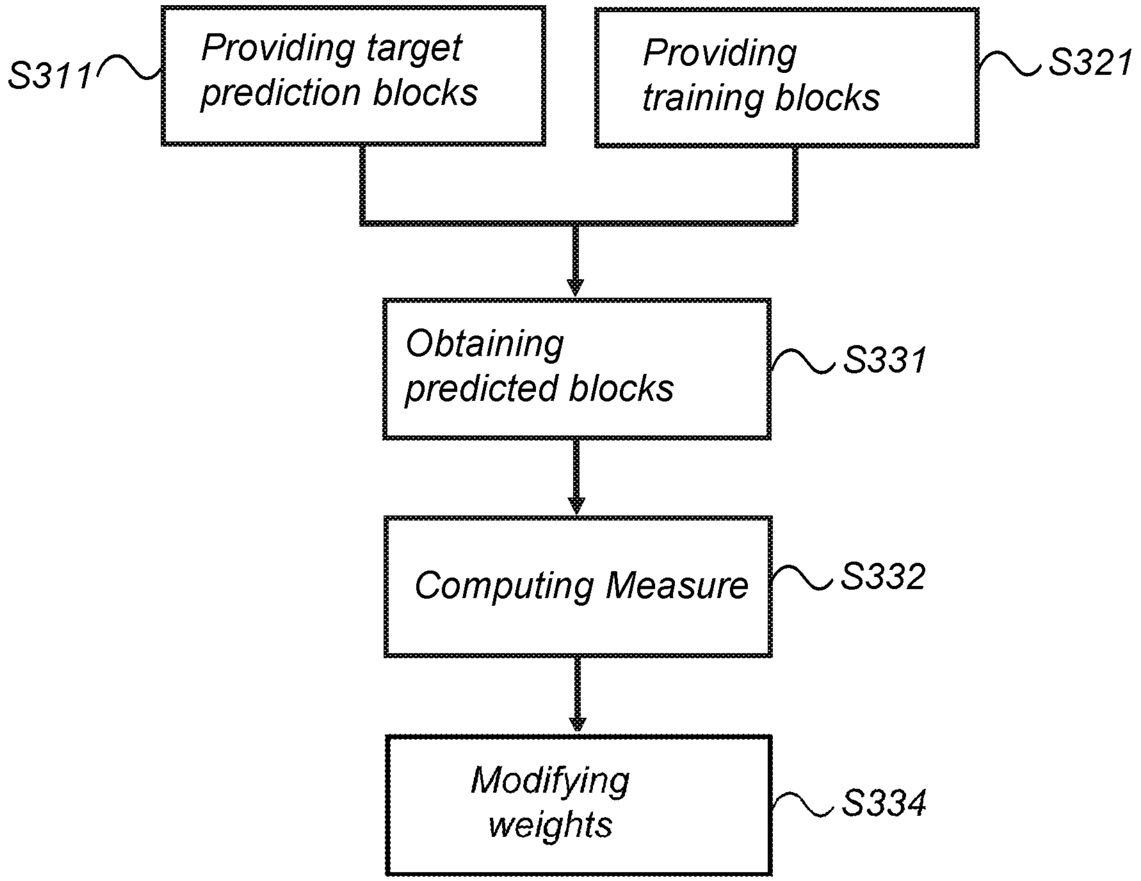
FIG. 6 shows a flow chart illustrating a method for obtaining training blocks for training a neural network system according to embodiments of the present invention.

With further reference to FIG. 6 there is depicted a flow chart illustrating a method for training the neural network system, for example the embodiment depicted in FIG. 2. At S311 a set of adaptive length target prediction (true) blocks are provided. This occurs alongside providing a set of training blocks being an impaired representation of the target prediction blocks (e.g. a quantized representation) at S321. The target prediction blocks comprise a non-quantized set of transform coefficients $X_k$. The training blocks are provided to the neural network system 201 and processed such that a set of predicted blocks are obtained at S331. By comparing the outputted predicted blocks comprising the at least one predicted transform coefficient $\bar{X}_k$ with the target prediction blocks, a measure, e.g. of similarity, is obtained at S332. The measure may be an error measure, wherein a low error measure indicates a high level of similarity. The measure may be a negative likelihood, such as the negative log likelihood (NLL), wherein a low measure indicates a high level of similarity. The measure may be a Mean Absolute Error (MAE) or a Mean Square Error (MSE), where a high level of similarity will be indicated by a low MAE or MSE. At S333 the measure is used for modifying the weights of the neural network system 201 to reduce or minimize the measure.

In one example, the measure is referred to as a loss function or 'loss', as is directly computed as the NLL as $$\text{Loss}=NLL(X_k,\bar{X}_k). \tag{1}$$

In calculating the NLL loss the predicted at least one transform coefficent $\bar{X}_k$ is repersented by at least one distribution parameter for the at least one predicted transform coefficent $\bar{X}_k$. The NLL function is thus applied to the at least one distribution parameter which repersents the predicted at least one transfrom coefficent $\bar{X}_k$. The at least one distribution parameter parametrizes a probability distribution for the at least one the at least one predicted transform coefficent $\bar{X}_k$.

In other implementations the loss is calculated as the MSE according to:

$$\text{Loss}=\frac{1}{K}\sum\left(X_k-\bar{X}_k\right)^2 \tag{2}$$

or the loss may be calculated as the MAE according to:

$$\text{Loss}=\frac{1}{K}\sum\left|X_k-\bar{X}_k\right|. \tag{3}$$

In calculating the MSE and MAE loss the at least one predicted transform coefficient $\bar{X}_k$ is used as such.

In some cases, a predicted block may represent more than one training block (and the associated target prediction block) with a single predicted converted block, in such cases the predicted blocks may be inversely converted into blocks individually corresponding to a training block (and the associated target prediction block) such that the measure may be computed.

Figure 3A:
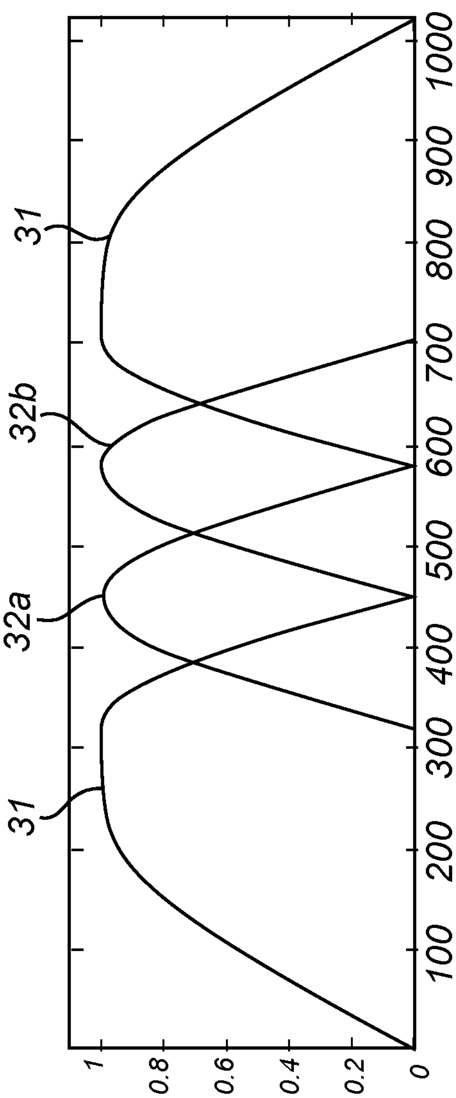
FIG. 3*a-b* show a merging process of time window functions.

With reference to FIG. 3*a* there is illustrated a sequence of time domain window functions 31, 32*a*, 32*b*, 33. FIG. 3*a* illustrates the window sequence for a typical 2:1 block length switch. The first long window 31 is followed by two short windows 32*a*, 32*b*, which in turn are followed by a second long window 33. The short time domain window functions 32*a*, 32*b* may overlap by 50%, where adding the squared short window functions results in a value of one for the overlapping portion. Additionally, the sum of the square of each window function 31, 32*a*, 32*b*, 33 will result in a value of one for every overlap.

In some implementations, the long windows 31, 33 may further be a bridge-in window 31 and a bridge-out window 33 respectively, especially adapted to respectively precede and succeed short windows 32*a*, 32*b*. The window functions 31, 32*a*, 32*b*, 33 are at least partially overlapping in time. Each window function 31, 32*a*, 32*b*, 33 is associated with a set of transform coefficient blocks, a long transform coefficient block with a long window function 31, 33, and a short transform coefficient block with a short window function 32*a*, 32*b*.

In some additional implementations, where the number of transform coefficients in each block is one out of more than two alternatives (e.g. one out of 256, 128 and 64 coefficients as mentioned above) the bridge-in window 31 and a bridge-out window 33 functions may comprise more than two bridging window functions, e.g. one for each type of transition between the variable length blocks. If the blocks have a length of one out of 256, 128 and 64 there may be defined an in and out bridging window function for each of: 256 to 128, 256 to 64 and 128 to 64.

Figure 3B:
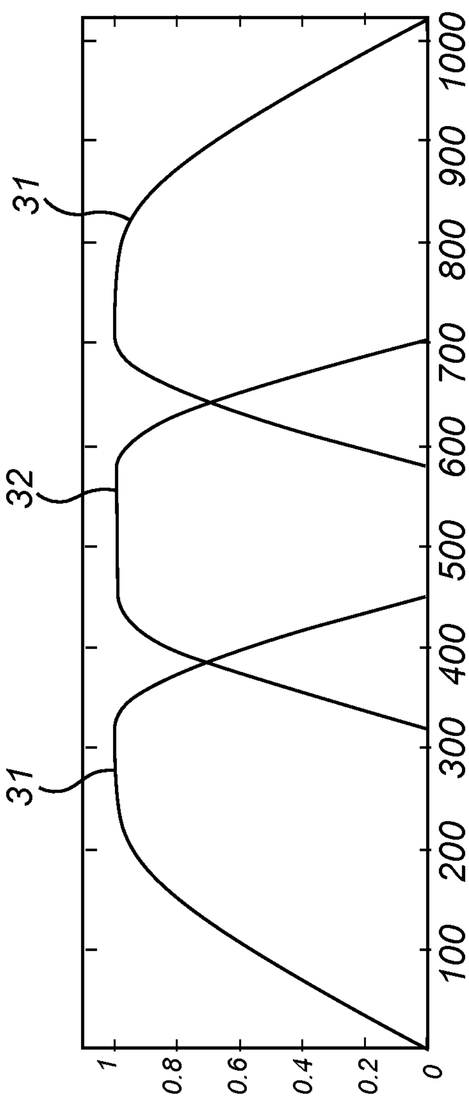

With further reference to FIG. 3*b* there is illustrated a long converted window 32 (with an associated long converted block) that is the result of a conversion of two short window functions 32*a*, 32*b* (and two short transform coefficient blocks).

By inverse transforming the quantized transform coefficients of a first and second (short) block (their respective window function is shown in FIG. 3*a* as 32*a* and 32*b*) back into a windowed time domain representation, they may be merged into a long converted block. This may be achieved by overlap adding the windowed time domain representation of the first and second blocks and transforming the overlap added time domain representation of the first and second blocks into a converted block having the first number of quantized transform coefficients.

For example, if the transform coefficients are Modified Discrete Cosine Transform (MDCT) coefficients, the intervening short blocks (associated with window functions 32*a*, 32*b*) may be merged into a single long block by inverting the MDCT to short time domain segments and overlap adding the short time domain segments. A DCT type 4 may then be used to compute transform coefficients of the equivalent converted long block 32 with a flat-top window. The window sequence after this merging/conversion operation is shown in FIG. 3*b*. It is further noted that this procedure of conversion may be accomplished while preserving perfect reconstruction properties of the transform coefficents (in the absence of quantization).

Figure 4:
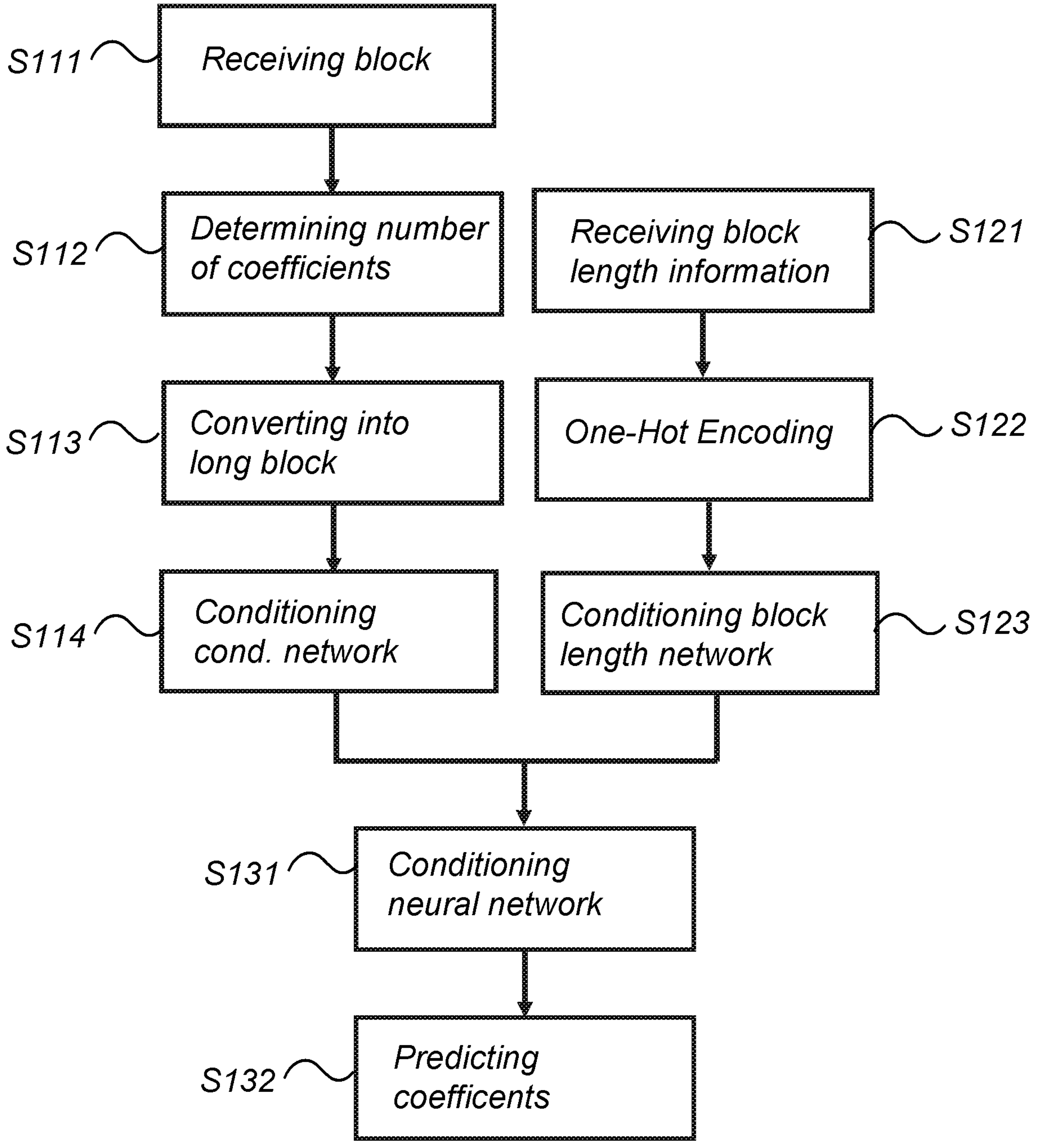
FIG. 4 shows a flow chart illustrating a method for predicting at least one transform coefficient from quantized transform coefficients according to an embodiment of the invention.

With reference to FIG. 4, there is depicted a flow chart illustrating a method for predicting at least one transform coefficient from quantized transform coefficients according to an embodiment of the invention. At S111, the neural network system receives a frame comprising quantized transform coefficients. The neural network system determines that at least one block of the frame comprises the second number of transform coefficients at S112 and proceeds by converting at least the block with the second number of transform coefficients into a converted block with the first number of transform coefficients at S113. Information representing the quantized transform coefficients of a converted block is one piece of information upon which at least one conditioning variable, used to condition the main neural network at S131, is based upon. Optionally, the method involves conditioning a conditioning neural network at S114 with information representing the quantized transform coefficients of a converted block and using the at least one output variable of the conditioning neural network to condition the main neural network at S131.

Further, the method involves receiving block length information at S121. A representation of the block length information is used as one piece of information for conditioning the main neural network at S131. Optionally, the block length information is used to first condition a block length neural network at S123 wherein the predicted at least one output variable of the block length neural network is used to condition the main neural network at S131. Also, some embodiments comprise One-Hot encoding of the block length information at S122, wherein the One-Hot encoded block length information is used to either condition the block length neural network at S123 or as information which is part of the information used to condition the main neural network at S131.

At S131, the main neural network predicts at least one output variable given the at least one conditioning variable and wherein the at least one output variable is provided to the output stage (e.g., an output neural network) at S132. The output stage at S132 predicts the at least one transform coefficient.

Figure 5:
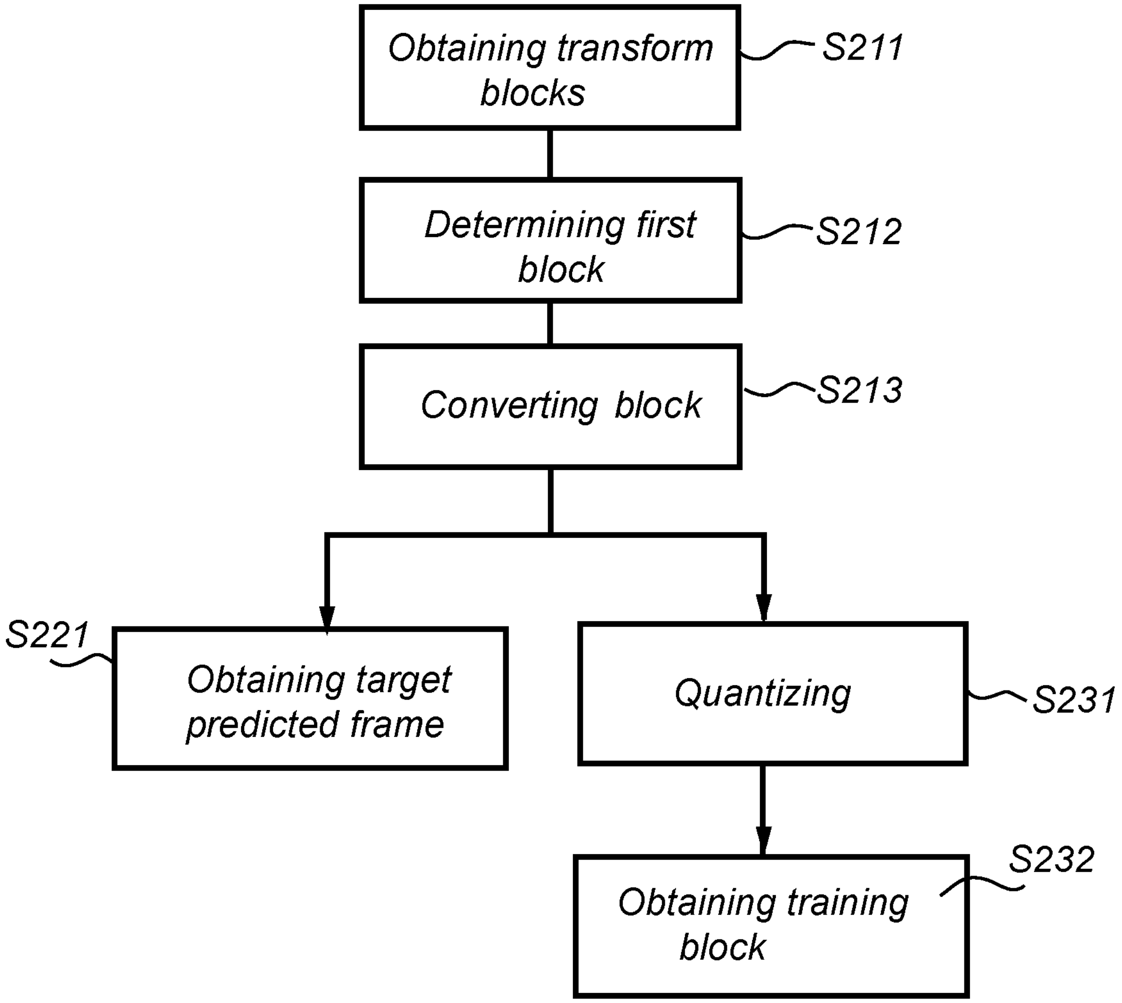
FIG. 5 shows a flow chart illustrating a method for obtaining training blocks for training a neural network system according to embodiments of the present invention.

FIG. 5 depicts a flow chart illustrating a method for obtaining training blocks (training blocks for input and target predicted blocks for comparison with the output) for training a neural network system for predicting the transform coefficients of an adaptive block length media signal according to embodiments of the present invention. At S211, a set of transform blocks is obtained. For example, a batch of waveforms or a media signal has been divided into a set of time domain segments (e.g. forming a time domain frame) and each time domain segment has been transformed into a set of varying length transform blocks (e.g. a transform domain frame). Alternatively, a batch of waveforms or a media signal has been processed with a transient detector as described in the above to determine the length of each block. At S212 it is determined that a first block comprises the second number of transform coefficients and this block is converted at S213 to a converted block with a first number of transform coefficients. At S221, a target predicted block is obtained. The target predicted block obtained at S221 may be the converted block itself.

At S231 the converted block is quantized to form a quantized block. That is, the quantized block does not represent the complete information originally present in the determined first block, thus the quantized block may be referred to as an impaired block which the neural network should learn to use to predict a non-impaired block. At S232 a training block is obtained from the quantized block obtained at S231. The training block may be quantized block as such. In some implementations, the further steps of using the target training block as input to the neural network during training and using the target predicted block as the training is included.

Blocks determined to comprise the first number of transform coefficients may be processed analogously to obtain training blocks and target predicted blocks, wherein the step S213 is omitted.

In some implementations, a media signal or a batch of waveforms is processed with a transient detector which determines the transform length as discussed in the above. Thus, the set of transform blocks will contain all different types of blocks and window functions.

In the above, possible methods of training and operating a deep-learning-based system for determining an indication of an audio quality of an input audio sample, as well as possible implementations of such system have been described. Additionally, the present disclosure also relates to an apparatus for carrying out these methods. An example of such apparatus may comprise a processor (e.g., a central processing unit (CPU), a graphics processing unit (GPU), a digital signal processor (DSP), one or more application specific integrated circuits (ASICs), one or more radio-frequency integrated circuits (RFICs), or any combination of these) and a memory coupled to the processor. The processor may be adapted to carry out some or all of the steps of the methods described throughout the disclosure.

The apparatus may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions (sequential or otherwise) that specify actions to be taken by that apparatus. Further, the present disclosure shall relate to any collection of apparatus that individually or jointly execute instructions to perform any one or more of the methodologies discussed herein.

The present disclosure further relates to a program (e.g., computer program) comprising instructions that, when executed by a processor, cause the processor to carry out some or all of the steps of the methods described herein.

Yet further, the present disclosure relates to a computer-readable (or machine-readable) storage medium storing the aforementioned program. Here, the term "computer-readable storage medium" includes, but is not be limited to, data repositories in the form of solid-state memories, optical media, and magnetic media, for example.

Unless specifically stated otherwise, as apparent from the following discussions, it is appreciated that throughout the disclosure discussions utilizing terms such as "processing", "computing", "calculating", "determining", "analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Various aspects of the present invention may be appreciated from the following list of enumerated example embodiments (EEEs):

EEE1. A method for predicting, with a computer implemented neural network system, at least one transform coefficient representing frequency content of an adaptive block length media signal, comprising the steps of:

- receiving a block of a frame, each block of the frame comprising a set of quantized transform coefficients representing a partial time segment of said media signal,
- receiving block length information indicating a number of quantized transform coefficients for each block of the frame, the number of quantized transform coefficients being one of a first number or a second number, wherein said first number is greater than said second number,
- determining that at least a first block of the frame has said second number of quantized transform coefficients,
- converting at least said first block into a converted block having said first number of quantized transform coefficients,
- conditioning a main neural network trained to predict at least one output variable given at least one conditioning variable, the at least one conditioning variable being based on conditioning information, said conditioning information comprising a representation of said converted block and a representation of block length information for said first block;
- providing said at least one output variable to an output stage configured to provide at least one predicted transform coefficient from said at least one output variable.

EEE2. The method of EEE 1, further comprising receiving a set of perceptual model coefficients for each block of the frame, and wherein the conditioning information further includes said set of perceptual model coefficients.

EEE3. The method of EEE 1, further comprising receiving a spectral envelope for each block in said frame, and wherein the conditioning information further includes said spectral envelope.

EEE4. The method of EEE 1, further comprising:

- conditioning a block length neural network with said representation of the block length information for said first block, said block length neural network being trained to output said representation of the block length information for said first block given block length information.

EEE5. The method of EEE 4, wherein conditioning the block length neural network with said block length information comprises encoding said block length information as a one-hot vector and conditioning said block length neural network with said one-hot vector.

EEE6. The method of EEE 1, further comprising the step:

- conditioning a conditioning neural network with said quantized transform coefficients of said converted block, wherein the conditioning neural network is trained to output said representation of said converted block given quantized transform coefficients.

EEE7. The method of EEE 1, wherein converting at least said first block into said converted block comprises upsampling said first block.

EEE8. The method of EEE 1, further comprising determining that at least said first block and a following second block have said second number of transform coefficients, and wherein converting at least said first block into said converted block comprises converting at least said first and second block into a converted block.

EEE9. The method according to any preceding EEE, wherein the quantized transform coefficients representing frequency content are Discrete Cosine Transform, DCT, coefficients.

EEE10. The method according to any preceding EEE further comprising:

- receiving, by an inverse transform unit, said predicted transform coefficients and said block length information,
- transforming said predicted transform coefficients into a time domain signal.

EEE11. The method according to EEE 8, wherein said first number is a multiple N of said second number and determining that at least said first block and said following second block have said second number of quantized transform coefficients comprises

- determining that N consecutive blocks of the frame have said second number of quantized transform coefficients.

EEE12. The method according EEE 8, wherein converting at least said first and second block into said converted block comprises concatenating at least said first and second block into a converted block.

EEE13. The method according to EEE 8, wherein receiving the block length information comprises:

- receiving, for each block of the frame, a representation of a respective time domain window function, wherein the window function of said first and second block partially overlap.

EEE14. The method according to EEE 13, wherein converting at least said first and second block into said converted block comprises:

- inverse transforming the quantized transform coefficients into a windowed time domain representation of the first and second block, overlap-adding the windowed time domain representation of the first and second block, transforming the overlap-added time domain representation of the first and second block into a converted block having said first number of quantized transform coefficients.

EEE15. A method for obtaining at least one training block for training a computer implemented neural network system to predict at least one transform coefficient of an adaptive block length media signal, comprising:

obtaining a set of transform blocks each comprising a number of transform coefficients representing frequency content of a media signal, the number of transform coefficients in each block being a first number or a second number, wherein the first number is greater than the second number, determining that a first block comprises the second number of transform coefficients, converting the first block into a converted block having the first number of transform coefficients, obtaining a target predicted block from the converted block, quantizing the converted block, and obtaining a training block from the quantized converted block.

EEE16. A computer implemented neural network system for predicting transform coefficients representing frequency content of an adaptive block length media signal, said neural network system comprising:

an adaptive block pre-processing unit configured to:

receive a frame comprising a set of quantized transform coefficients representing a partial time segment of a media signal, receive block length information indicating a number of quantized transform coefficients for each block in said frame, the number of quantized transform coefficients being one of a first number or a second number, wherein said first number is greater than said second number, determine that at least a first block has said second number of transform coefficients, and convert at least said first block into a converted block having said first number of quantized transform coefficients, a main neural network, wherein said main neural network is trained to predict at least one output variable given at least one conditioning variable based on conditioning information, said conditioning information comprising a representation of said converted block and a representation of block length information for said first block, and an output stage, configured to provide at least one predicted transform coefficient from said at least one output variable.

EEE17. A neural network decoder, comprising the computer implemented neural network system according to EEE 16.

EEE18. A neural network decoder according to EEE 17, further comprising an inverse transform unit, said inverse transform unit being configured to:

receive said at least one predicted transform coefficient and block length information, and transform said at least one predicted transform coefficient to a time domain signal.

EEE19. The neural networks system according to EEE 16, wherein said neural networks system has been trained by:

providing a set of target prediction blocks, providing, to said adaptive block pre-processing unit, a set of training blocks comprising at least one training block with said first number of transform coefficients and at least one training block with said second number of transform coefficients, the set of training blocks being an impaired representation of said set of target prediction blocks, obtaining, from said output stage, a set of predicted blocks from said set of training blocks, computing a measure of the set of predicted blocks with respect to said set of target prediction blocks, modifying the weights of said neural network system to decrease the measure.

EEE20. The neural network system according to EEE 19, wherein said measure is one of a negative likelihood, a mean square error or an absolute error.

The invention claimed is:

1. A method for predicting, with a computer implemented neural network system, at least one transform coefficient representing frequency content of an adaptive block length media signal, comprising the steps of:

receiving a frame including two or more blocks, each block of the frame comprising a set of quantized transform coefficients representing a partial time segment of said media signal, receiving block length information indicating a number of quantized transform coefficients for each block of the frame, the number of quantized transform coefficients being one of a first number or a second number, wherein said first number is greater than said second number, wherein a first subset of the two or more blocks has said first number of quantized transform coefficients and a second subset of the two or more blocks has said second number of quantized transform coefficients, determining that at least a first block of the frame has said second number of quantized transform coefficients, converting at least said first block into a converted block having said first number of quantized transform coefficients, conditioning a main neural network trained to predict at least one output variable given at least one conditioning variable, the at least one conditioning variable being based on conditioning information, said conditioning information comprising a representation of said converted block and a representation of block length information for said first block, providing said at least one output variable to an output stage configured to provide at least one predicted transform coefficient from said at least one output variable.

2. The method according to claim 1, further comprising receiving a set of perceptual model coefficients for each block of the frame, and wherein the conditioning information further includes said set of perceptual model coefficients.

3. The method according to claim 1, further comprising receiving a spectral envelope for each block in said frame, and wherein the conditioning information further includes said spectral envelope.

4. The method according to claim 1, further comprising:

conditioning a block length neural network with said representation of the block length information for said first block, said block length neural network being trained to output said representation of the block length information for said first block given block length information.

5. The method according to claim 4, wherein conditioning the block length neural network with said block length information comprises encoding said block length information as a one-hot vector and conditioning said block length neural network with said one-hot vector.

6. The method according to claim 1, further comprising the step:

conditioning a conditioning neural network with said quantized transform coefficients of said converted block, wherein the conditioning neural network is trained to output said representation of said converted block given quantized transform coefficients.

7. The method according to claim 1, wherein converting at least said first block into said converted block comprises up-sampling said first block.

8. The method according to claim 1, wherein the quantized transform coefficients representing frequency content are Discrete Cosine Transform, DCT, coefficients.

9. The method according to claim 1, further comprising:

receiving, by an inverse transform unit, said predicted transform coefficients and said block length information, transforming said predicted transform coefficients into a time domain signal.

10. The method according to claim 1, further comprising determining that at least said first block and a following second block have said second number of transform coefficients, and wherein converting at least said first block into said converted block comprises converting at least said first and second block into a converted block.

11. The method according to claim 10, wherein said first number is a multiple N of said second number and determining that at least said first block and said following second block have said second number of quantized transform coefficients comprises determining that N consecutive blocks of the frame have said second number of quantized transform coefficients.

12. The method according to claim 10, wherein converting at least said first and second block into said converted block comprises concatenating at least said first and second block into a converted block.

13. The method according to claim 10, wherein receiving the block length information comprises:

receiving, for each block of the frame, a representation of a respective time domain window function, wherein the window function of said first and second block partially overlap.

14. The method according to claim 13, wherein converting at least said first and second block into said converted block comprises:

inverse transforming the quantized transform coefficients into a windowed time domain representation of the first and second block, overlap-adding the windowed time domain representation of the first and second block, transforming the overlap-added time domain representation of the first and second block into a converted block having said first number of quantized transform coefficients.

15. A method for obtaining at least one training block for training a computer implemented neural network system to predict at least one transform coefficient of an adaptive block length media signal, comprising:

obtaining a set of transform blocks each comprising a number of transform coefficients representing frequency content of a media signal, the number of transform coefficients in each block being a first number or a second number, wherein the first number is greater than the second number, wherein a first subset of the set of transform blocks has the first number of transform coefficients and a second subset of the set of transform blocks has the second number of transform coefficients, and wherein the number of transform coefficients of a given block is related to a variance with respect to time of temporal characteristics of an audio signal associated with the given block, determining that a first block comprises the second number of transform coefficients, converting the first block into a converted block having the first number of transform coefficients, obtaining a target predicted block from the converted block, quantizing the converted block, and obtaining a training block from the quantized converted block.

16. A computer implemented neural network system for predicting transform coefficients representing frequency content of an adaptive block length media signal, said neural network system comprising:

an adaptive block pre-processing unit configured to:

receive a frame including two or more blocks, each block of the frame comprising a set of quantized transform coefficients representing a partial time segment of a media signal, receive block length information indicating a number of quantized transform coefficients for each block in said frame, the number of quantized transform coefficients being one of a first number or a second number, wherein said first number is greater than said second number, wherein a first subset of the two or more blocks has said first number of quantized transform coefficients and a second subset of the two or more blocks has said second number of quantized transform coefficients, determine that at least a first block has said second number of transform coefficients, and convert at least said first block into a converted block having said first number of quantized transform coefficients, a main neural network, wherein said main neural network is trained to predict at least one output variable given at least one conditioning variable based on conditioning information, said conditioning information comprising a representation of said converted block and a representation of block length information for said first block, and an output stage, configured to provide at least one predicted transform coefficient from said at least one output variable.

17. The neural network system according to claim 16, wherein said neural network system has been trained by:

providing a set of target prediction blocks, providing, to said adaptive block pre-processing unit, a set of training blocks comprising at least one training block with said first number of transform coefficients and at least one training block with said second number of transform coefficients, the set of training blocks being an impaired representation of said set of target prediction blocks, obtaining, from said output stage, a set of predicted blocks from said set of training blocks, computing a measure of the set of predicted blocks with respect to said set of target prediction blocks, modifying the weights of said neural network system to decrease the measure.

18. The neural network system according to claim 17, wherein said measure is one of a negative likelihood, a mean square error or an absolute error.

19. A neural network decoder, comprising the computer implemented neural network system according to claim 16.

20. A neural network decoder according to claim 19, further comprising an inverse transform unit, said inverse transform unit being configured to:

receive said at least one predicted transform coefficient and block length information, and transform said at least one predicted transform coefficient to a time domain signal.

* * * * *